(12) United States Patent
Gandhi

(10) Patent No.: US 10,850,220 B2
(45) Date of Patent: Dec. 1, 2020

(54) MODULAR INLET FILTER FOR A COMPRESSOR SYSTEM

(71) Applicant: Ingersoll-Rand Company, Davidson, NC (US)

(72) Inventor: Hardik Dineshchandra Gandhi, Ahmedabad (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 684 days.

(21) Appl. No.: 14/833,862

(22) Filed: Aug. 24, 2015

(65) Prior Publication Data
US 2017/0056801 A1   Mar. 2, 2017

(51) Int. Cl.
*B01D 46/00* (2006.01)
*B01D 46/12* (2006.01)
*F04B 53/20* (2006.01)

(52) U.S. Cl.
CPC ....... *B01D 46/0013* (2013.01); *B01D 46/002* (2013.01); *B01D 46/0005* (2013.01); *B01D 46/0023* (2013.01); *B01D 46/12* (2013.01); *F04B 53/20* (2013.01); *B01D 2267/30* (2013.01)

(58) Field of Classification Search
CPC .................................................. B01D 46/0013
See application file for complete search history.

(56) References Cited

U.S. PATENT DOCUMENTS

| | | | |
|---|---|---|---|
| 3,986,850 A | | 10/1976 | Wilcox |
| 4,838,910 A | * | 6/1989 | Stollenwerk ........... B01D 46/00 55/385.2 |
| 4,865,803 A | * | 9/1989 | Dillmann ............... B01D 46/12 376/314 |
| 5,332,409 A | * | 7/1994 | Dralle ................ B01D 46/0013 55/484 |
| 5,470,176 A | * | 11/1995 | Corcoran ........... B01D 46/0013 404/72 |
| 5,593,470 A | | 1/1997 | Shagott et al. |
| 6,174,350 B1 | * | 1/2001 | Rohn ..................... A47L 5/365 15/353 |
| 6,497,739 B2 | | 12/2002 | McGill |
| 7,128,771 B2 | * | 10/2006 | Harden ............. B01D 46/0013 55/385.2 |
| 7,998,253 B2 | | 8/2011 | Gregg |
| 8,398,753 B2 | | 3/2013 | Sergi et al. |
| 8,500,838 B2 | | 8/2013 | Pike et al. |
| 8,747,505 B2 | | 6/2014 | Crabtree et al. |
| 9,034,068 B2 | * | 5/2015 | Ball ................... B01D 46/0005 55/483 |
| 9,049,838 B2 | * | 6/2015 | Crabtree .............. A01K 1/0058 |
| 9,126,135 B2 | * | 9/2015 | Crabtree ............ B01D 46/0023 |
| 9,802,144 B2 | * | 10/2017 | Maier .................. B01D 46/002 |

(Continued)

*Primary Examiner* — Christopher P Jones
*Assistant Examiner* — Brit E. Anbacht
(74) *Attorney, Agent, or Firm* — Taft Stettinius & Hollister LLP

(57) ABSTRACT

A reconfigurable modular fluid filter is disclosed herein. The modular fluid filter includes a base filter housing having an opening formed in one or more walls thereof. Each opening is constructed to receive and couple with one of a filter element module, a secondary filter housing, an outlet port and a flow blocking cover. An unrestricted internal flowpath within the base filter housing is fluidly connected between each filter element module and the outlet port.

20 Claims, 4 Drawing Sheets

(56) References Cited

U.S. PATENT DOCUMENTS

| | | | |
|---|---|---|---|
| 10,434,449 B1* | 10/2019 | Coupal | B01D 46/0013 |
| 2005/0022489 A1* | 2/2005 | Harden | B01D 46/4236 |
| | | | 55/481 |
| 2006/0162300 A1* | 7/2006 | Sharifi | B01D 46/0023 |
| | | | 55/350.1 |
| 2006/0277875 A1* | 12/2006 | Schuld | B01D 46/24 |
| | | | 55/484 |
| 2007/0094946 A1 | 5/2007 | Schoeny et al. | |
| 2007/0220851 A1* | 9/2007 | Parker | F24F 3/16 |
| | | | 55/484 |
| 2010/0218469 A1* | 9/2010 | Radaelli | B01D 46/02 |
| | | | 55/378 |
| 2010/0313760 A1* | 12/2010 | Crabtree | B01D 46/0005 |
| | | | 96/15 |
| 2011/0113795 A1 | 5/2011 | Montminy et al. | |
| 2011/0308210 A1* | 12/2011 | Crabtree | B01D 46/10 |
| | | | 55/483 |
| 2012/0311978 A1* | 12/2012 | Crabtree | F24F 3/1603 |
| | | | 55/385.2 |
| 2014/0047806 A1* | 2/2014 | Heidenreich | B01D 46/002 |
| | | | 55/484 |
| 2015/0209462 A1* | 7/2015 | Turbett | B01D 46/0002 |
| | | | 436/1 |
| 2015/0265959 A1* | 9/2015 | Crabtree | A01K 1/0047 |
| | | | 55/485 |
| 2016/0067644 A1* | 3/2016 | Scaife | G06Q 10/08 |
| | | | 95/273 |
| 2016/0101381 A1* | 4/2016 | Abbott | B01D 46/2411 |
| | | | 55/302 |
| 2017/0014744 A1* | 1/2017 | Maier | B01D 46/0002 |
| 2020/0094210 A1* | 3/2020 | Risbjerg Jarlkov | |
| | | | B01D 46/0005 |

* cited by examiner

MODULAR INLET FILTER FOR A COMPRESSOR SYSTEM

TECHNICAL FIELD

The present application generally relates to a modular inlet filter and more particularly, but not exclusively, to reconfigurable modular inlet filters for various configurations of industrial air compressor systems.

BACKGROUND

Industrial compressor systems are configured to produce large volumes of pressurized working fluid such as air or the like. Filtering working fluid prior to entry into the compressor system can minimize wear or damage to system components caused by foreign objects entrained with the fluid such as dirt or sand particles and the like. Some existing filter systems have various shortcomings relative to certain applications. Accordingly, there remains a need for further contributions in this area of technology.

SUMMARY

One embodiment of the present application is a unique a modular inlet filter for industrial air compressor systems. Other embodiments include apparatuses, systems, devices, hardware, methods, and combinations for industrial systems with a unique modular inlet filter. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
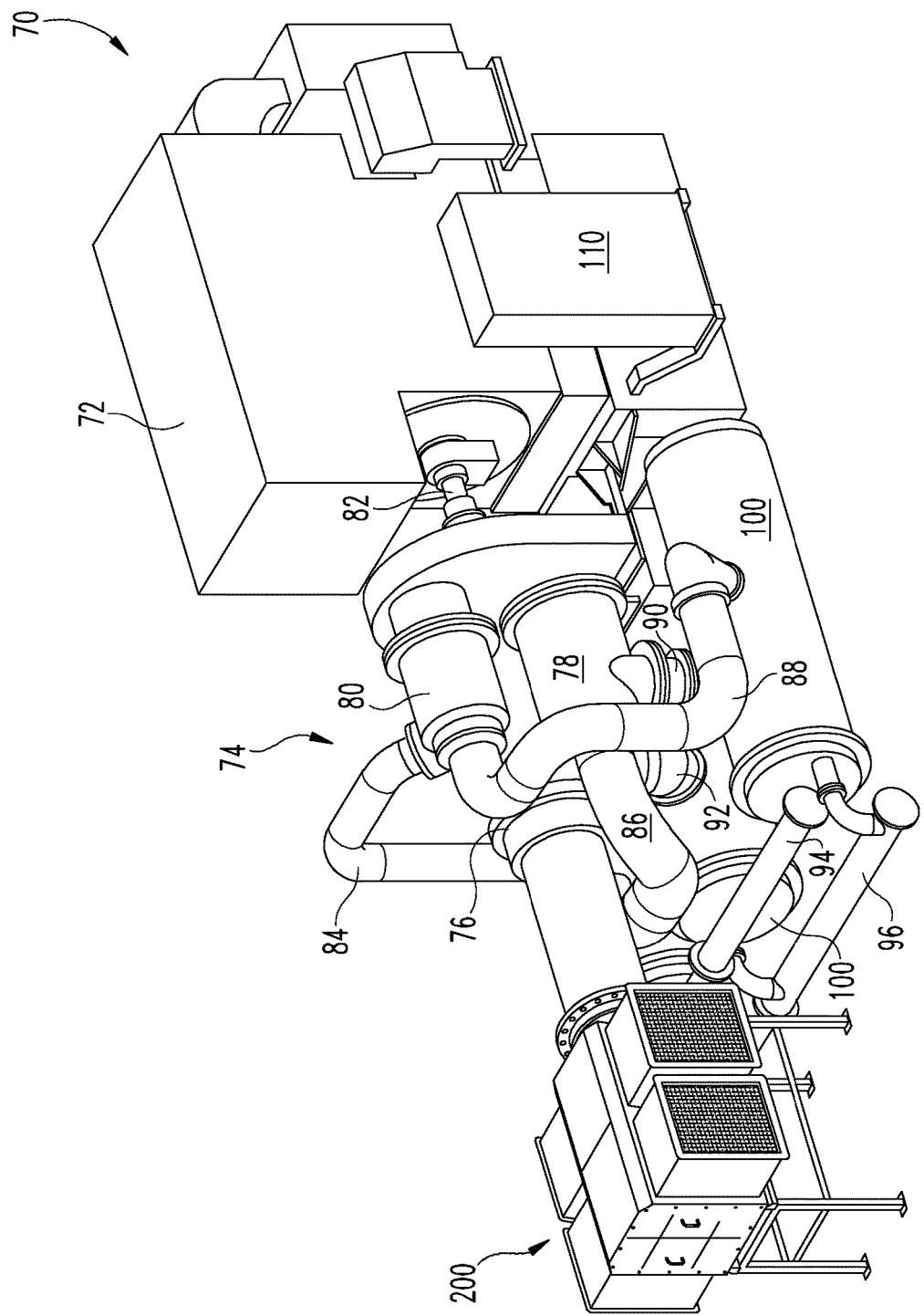
FIG. 1 is a perspective view of a modular inlet filter coupled to an inlet of a compressor system according to one embodiment of the present disclosure.

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

Industrial compressor systems can be designed with large variations in size and power. Typically, a unique inlet fluid filter assembly is designed and manufactured for each industrial plant and compressor system combination. Designing and assembling each unique filter can be relatively time consuming and costly. The present disclosure provides a common modular structure that can be reconfigured to support an increase or decrease in filter capacity as required for industrial plant and compressor system combinations. In this manner the modular filter system of the present disclosure is not only readily reconfigurable, but can be standardized for ease of manufacturing, servicing and component repair.

It should be noted that while the illustrative embodiment shows a compressor system operably connected to a modular fluid filter, that other systems requiring sources of filtered fluid are also contemplated herein. By way of example and not limitation, the modular filter of the present disclosure may be used with various types of compressors, blowers or other fluid moving devices for air supply systems in building or clean rooms and the like. Furthermore various types of filters/filter media may be used with the modular fluid filter as defined herein. One example can include fiberglass filters that are defined by layered fiberglass fibers to form the filter media and typically are reinforced with a metal grating that supports the fiberglass to prevent failure and collapse. Another example is polyester and pleated filters which are similar to fiberglass filters, but typically have a higher resistance to airflow and a superior dust-stopping capability. Yet another example is high efficiency particulate arrestance (HEPA) filters. HEPA unit filters the air passing through them at a very fine scale to filter 99.97 percent of all particles 0.3 microns or larger. Yet another example includes washable filters formed of various materials that rely on the build-up of dust along the media to improve the efficiency of the filter.

Referring to FIG. 1, an exemplary compressor system 70 with a reconfigurable modular filter 200 is illustrated in one exemplary form. The compressor system 70 includes a primary motive source 72 such as an electric motor, an internal combustion engine or a fluid-driven turbine and the like. The modular filter 200 is operable for supplying filtered fluid such as air to the compressor system 70. The compressor system 70 can include a compressor 74 with multi-stage compression and in the exemplary embodiment includes a first stage compressor 76, a second stage compressor 78, and a third stage compressor 80. In other embodiments a different number of compressor stages may be employed with the compressor 70. The compressor 70 can include centrifugal, axial and/or positive displacement compression means. The primary motive source 72 is operable for driving the compressor 70 via a drive shaft 82 to compress fluids such as air, natural gas, propane or the like.

Portions of the compressed air discharged from the compressor 74 can be transported through more one or more conduits 84, 86, 88, 90 and 92 to one or more intercoolers 100 and/or to another compressor stage. An inlet fluid manifold 94 and an outlet fluid manifold 96 can be fluidly connected to the intercoolers 100 to provide cooling fluid such as water or other liquid coolant to cool the compressed air after discharge from one or more of the compressor stages of the compressor 74. The compressor system 70 can also include a controller 110 operable for controlling the primary motive power source and various valving and fluid control mechanisms (not shown) between the compressor 74 and intercoolers 100. The compressor system of FIG. 1 is only one exemplary form of a compressor system that can be used with the teachings of the present disclosure. Other forms and configurations are also contemplated herein.

Figure 2:
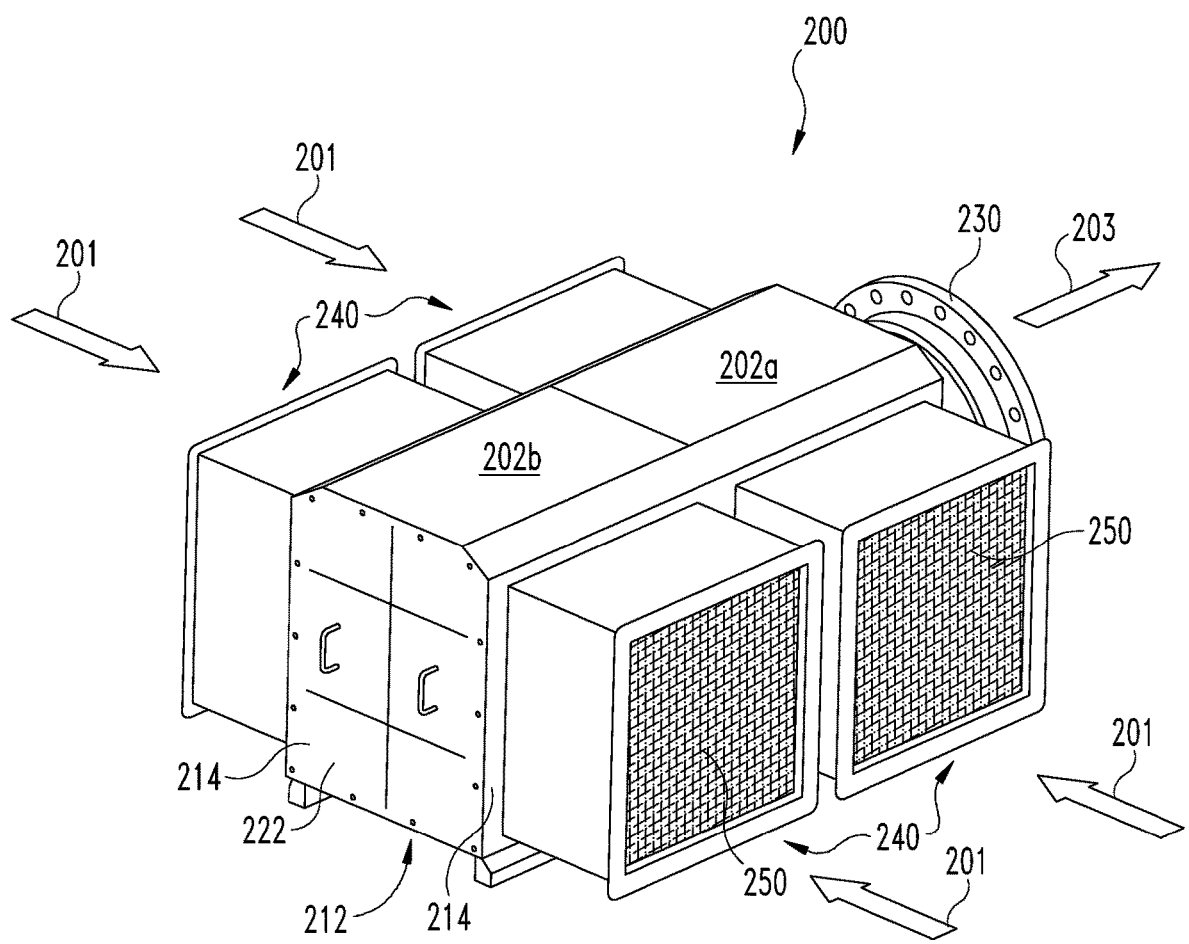
FIG. 2 is a perspective view of the modular inlet filter illustrated in FIG. 1.
Figure 3:
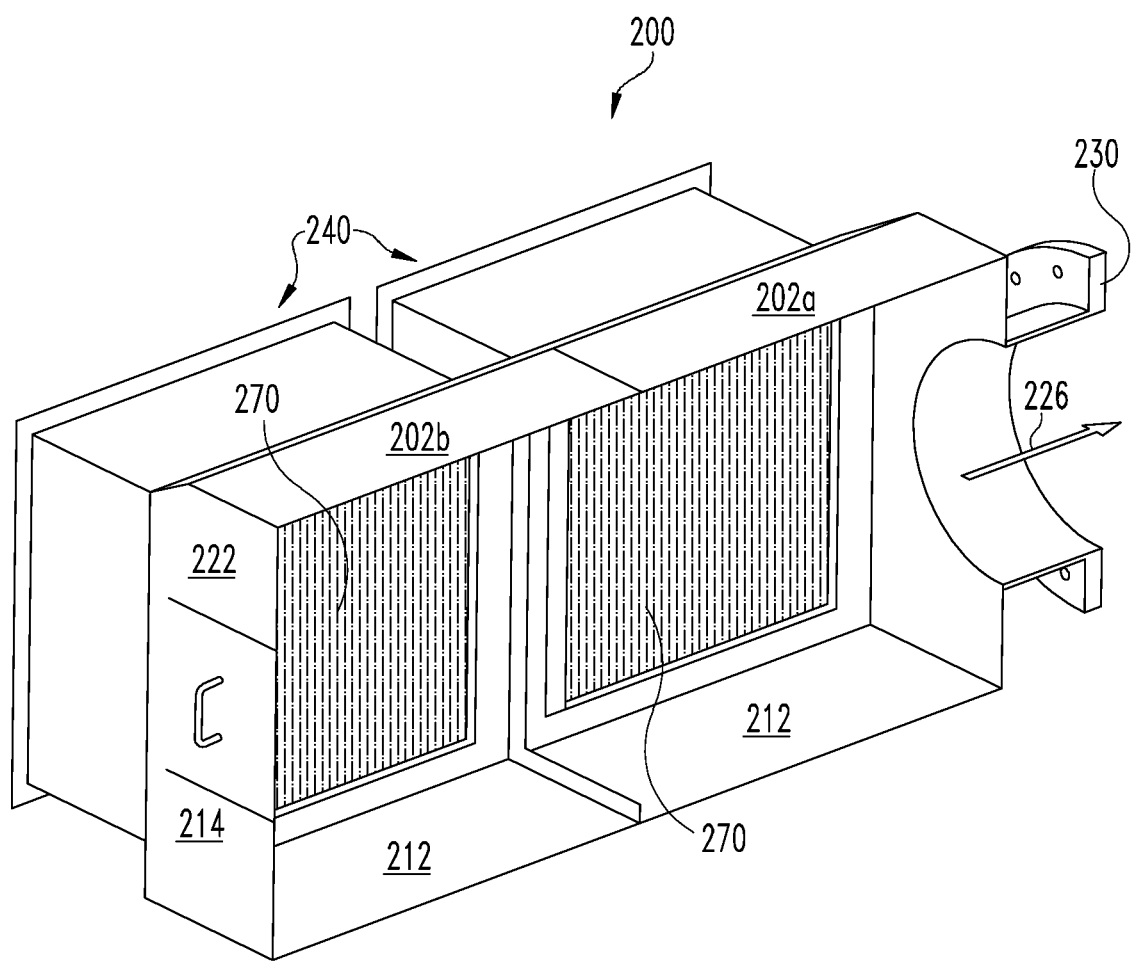
FIG. 3 is a perspective view of the modular inlet filter illustrated in FIG. 1 partially cutaway.
Figure 4:
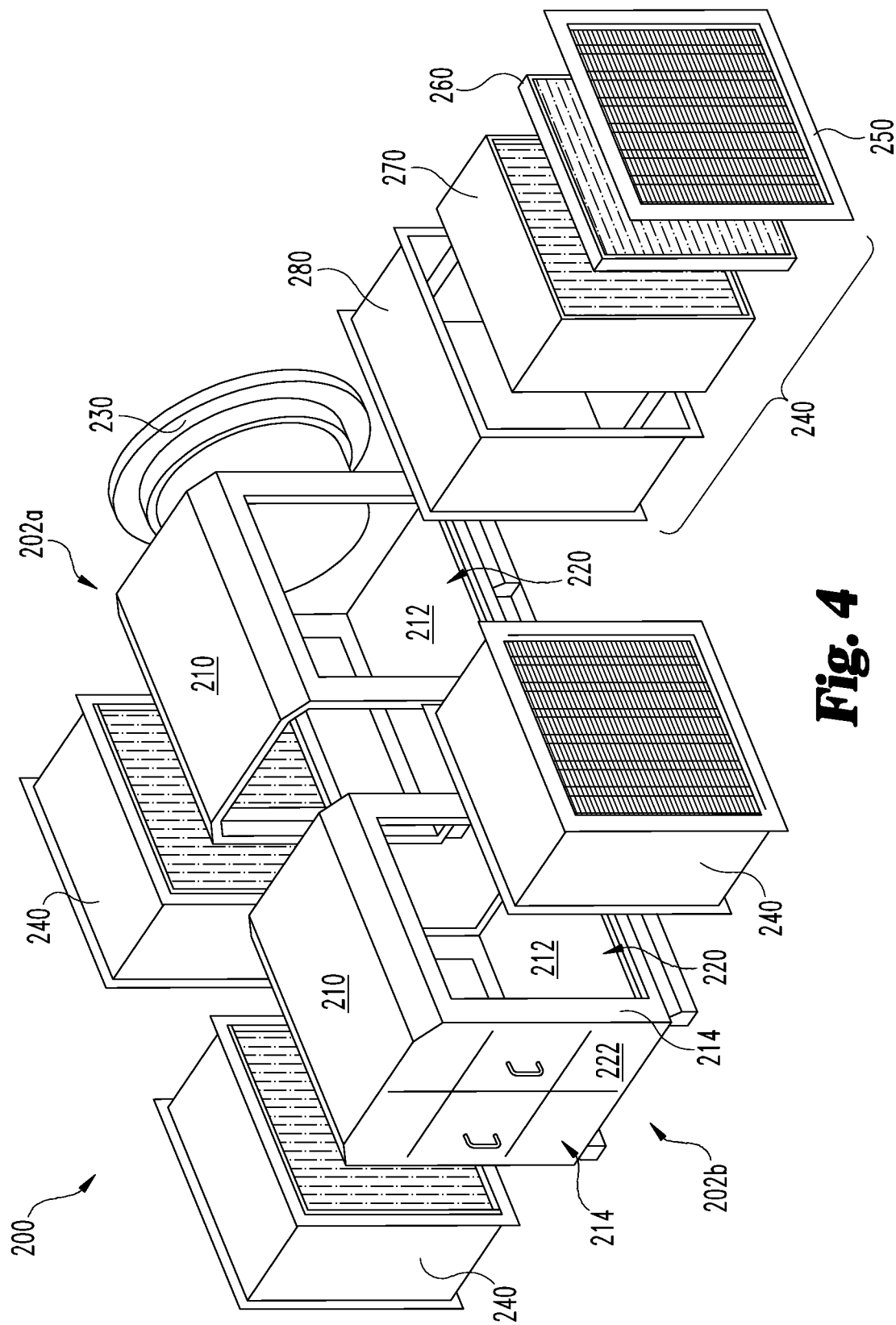
FIG. 4 is a perspective exploded view of the modular inlet filter illustrated in FIG. 1.

Referring now to FIGS. 2-4, a reconfigurable modular fluid filter 200 is shown therein. The modular fluid filter 200 includes a base filter housing 202a and can include a plurality of secondary filter housings 202b. In the disclosed embodiment there is only one secondary filter housing 202b depicted, however, additional secondary filter housings 202b can be connected, coupled, or otherwise attached to the base filter housing 202a and/or to any of the secondary filter housings 202b. The secondary filter housings 202b can be attached in a linear or axial direction in some embodiments and in other embodiments the secondary filter housings 202B may be attached in a transverse direction to the top, side, or bottom portions of the base filter housing 202a or one or more of the secondary filter housings 202b.

Inlet air flow depicted by arrows 201 (See FIG. 2) enter the reconfigurable modular fluid filter 200 and filtered air depicted by arrow 203 exits out of the reconfigurable modular fluid filter 200. The base filter housing 202a in the exemplary embodiment can include a top wall 210, a bottom wall 212, and a plurality of side walls 214. Similarly the secondary filter housings 202b can also include a top wall 210, bottom wall 212, and a plurality of side walls 214. While the filter housings 202a, 202b are generally depicted as rectangular, other forms and geometries are contemplated by the present disclosure. For example, portions can be rounded or have other complex geometrical shapes. Each of the filter housings 202a, 202b include one or more openings 220 in one of the side walls 214, top wall 210, or bottom wall 212. The exemplary embodiment depicts a plurality of openings 220 in the side walls 214 of the filter housings 202a, 202b. An outlet port or conduit 230 can be fluidly connected to the base filter housing 202a to direct the filtered fluid 203 to an apparatus or holding tank as desired. An internal flow path exemplified by arrow 226 (see FIG. 3) is defined by an open space internal to the filter housings 202a, and/or 202b and extending out of the outlet conduit 230.

In one aspect a secondary filter housing 202b can include a cover 222 to operably seal an opening 220 along an end wall or side wall 214 depending on the configuration. The cover 222 prevents or substantially prevents fluid from passing though the covered opening 220. In some forms a separate seal or gasket (not shown) can be operably assembled with the housings 202a, 202b to facilitate the sealing means. In other embodiments where the base filter housing 202a is the only filter housing in the system, the base filter housing 202a can include a cover 222 where the secondary filter housing 202b is presently shown in the depicted embodiment. Alternatively, in other embodiments each of the side walls of the secondary filter housing 202b can include openings with filters to permit air flow 201 to flow there through.

One or more filter element modules 240 can be operably attached proximate a corresponding opening 220 of a base filter housing 202a and/or a secondary filter housing 202b. The filter element module 240 can include a preload filter cover 250 operable for removing larger objects that may be entrained in the fluid. In some embodiments the preload filter cover 250 can be made from a screen or mesh type of material. A primary filter 260 can be disposed downstream of the preload cover 250 in certain embodiments. The primary filter 260 can be of a smaller or more restrictive flow path design so as to filter out smaller particles than the preload cover 250 is configured to remove. A secondary filter 270 can also be utilized with the system in certain embodiments. The secondary filter 270 can be positioned downstream of the primary filter 260 so as to further filter the fluid 201 within the filter element module 240.

A filter element module housing 280 can be operably configured to house the preload cover, the primary filter, and secondary filter 250, 260, 270 respectively. The housing 280 can include clips, abutments or other features (not shown) to hold the filter elements 250, 260, 270 in a desired position and prevent non-intentional removal. The filter element module housing 280 can be attached adjacent the openings 220 of the base filter housing 202a and/or one or more secondary filter housings 202b if so configured. The attachment method can include common mechanical means such as threaded fastener, weld, adhesive, or other mechanical attachment mechanisms as known to those skilled in the art. Likewise, the secondary filter housing 202b can also be attached via similar means to the base filter housing 202a so as to permit either permanent attachment or releasable attachment depending on the particular configuration desired. For reconfigurable modular fluid filters 200 used in different types of operations and/or having different flow rate requirements, the attachment features for the filter element module housing 280 and/or the secondary filter housings 202b may be releasably fixed so as to permit reconfiguration, however, permanent connections are also contemplated by the present disclosure.

The modular fluid filter 200 can be configured with as many secondary filter housings 202b and filter element modules 240 as desired to provide a predetermined flow rate of a filtered fluid. The modular fluid filter 200 can subsequently be reconfigured to increase or decrease the filter flow capacity. The size and configuration of various components of the modular fluid filter 200 is defined by the system requirements for filtered fluid. In this manner a reconfigurable modular fluid filter 200 can be assembled at a factory or onsite to match particular design requirements for filtered fluid flow entering the system and then reconfigured when the filtered flow requirements are changed. Construction of the housings 202a, 202b, covers 222 and filter element modules 240 can include suitable materials such as metal, composites, plastics or combinations thereof.

In operation the compressor system is configured to provide compressed working fluid such as air at a desired temperature and pressure to external systems. The compressor system can be used in any industrial application including, but not limited to automobile manufacturing, textile manufacturing, process industries, refineries, power plants, mining, material handling, etc. The controller permits user input to define parameters such as pressure, temperature and mass flow rate of one or more fluids. The controller can send command signals to the motor to rotate at a desired operating speed in order to drive the one or more compressors and control various valve members to control airflow rate, coolant flow rate and/or lubrication flow rates.

In the illustrative example, the compressor includes a three-stage centrifugal compressor system, however, other types of compressors or blowers having different fluid flow requirements are contemplated by the present disclosure. The modular fluid filter can be configured for one system and can be reconfigured when the filtered flow capacity requirements of the system changes. The modular fluid filter can be readily upsized by adding more filter modules and/or secondary housing modules. Likewise the modular fluid filter can be readily downsized by removing filter modules and closing off an opening with a cover or by removing a secondary housing module including all of the filter modules associated therewith.

In one aspect, the present disclosure includes a compressor system comprising: a reconfigurable modular fluid filter comprising: a base filter housing having an opening formed in one or more walls thereof, wherein each opening is constructed to removably couple with one of a filter element module, a secondary filter housing, an outlet port and a flow blocking cover; an unrestricted internal flowpath within the base filter housing fluidly connected between each filter element module and the outlet port; and wherein each filter element module is configured to filter a working fluid in parallel with one another and discharge filtered working fluid into the internal flowpath.

In refining aspects, each filter element module comprises: a preloading cover; a primary filter element positioned downstream of the preloading cover; and a secondary filter element positioned downstream of the primary filter; the secondary filter element includes a plurality of separable filter elements; the preloading cover is formed from a relatively coarse mesh; the primary filter and the secondary filter are formed of one of a replaceable material and a washable material; each filter element module includes an outer case for holding the preloading cover, the primary filter element and the secondary filter element in a desired position; the base filter housing is box shaped and the openings are optionally formed in a top, a bottom, either side, and either end thereof; each secondary filter housing includes: a plurality of openings formed therein; wherein each opening is adapted to removably couple with one of a filter element module, another secondary filter housing and a flow blocking cover; and a secondary unrestricted internal flowpath fluidly connecting each filter element module to the internal flowpath of the base filter housing; one or more secondary filter housings are connectable to the base filter housing along a horizontal and/or a vertical direction; the filter elements include filter media comprising a plurality of materials and densities; the outlet port is connectable to a system operable for compressing a fluid; and means for coupling modular housings to one another includes at least one of threaded fasteners, clips, press fit, weld, braze, and/or adhesive.

In another aspect, the present disclosure includes a modular fluid filter for a fluid compression system comprising: a base filter housing having a plurality of openings formed therein; wherein each opening is adapted to couple with one of a filter element module, a secondary filter housing, an outlet port and a flow blocking cover; an internal flowpath within the base filter housing fluidly connecting each filter element module to the outlet port; and wherein each filter element module is configured to filter a working fluid in parallel and discharge filtered working fluid into the internal flowpath and the outlet port is configured to deliver the filtered fluid to the fluid compression system.

In refining aspects, each filter element module includes a preloading cover; each filter element module includes a primary filter element positioned adjacent the preloading cover; each filter element module includes a secondary filter element positioned adjacent the primary filter; the secondary filter element includes a plurality of separable filter elements; each filter element includes an outer case for holding the a preloading cover, the primary filter element and the secondary filter element; the base filter housing includes an external wall and the openings are formed through the external wall; each secondary filter housing includes: a plurality of openings formed therein; wherein each opening is adapted to removably couple with one of a filter element module, another secondary filter housing and a flow blocking cover; and a secondary internal flowpath fluidly connecting each filter element module to the internal flowpath of the base filter housing; additional secondary filter housings are connectable to one of the base filter housing and/or another secondary filter housing in a direction perpendicular to a direction generally defined by a flow direction of the internal flowpath; the filter elements include filter media having different materials and densities; and the outlet port is connectable to an inlet port of a fluid compressor.

In another aspect, the present disclosure includes a method comprising determining a desired fluid flow capacity of an apparatus; assembling a modular fluid filter operable for supplying filtered fluid at the desired fluid flow capacity; and wherein the assembling includes coupling a predetermined number of filter element modules to a base filter housing and optionally to one or more secondary filter housings.

In refining aspects, the method includes reducing the flow capacity of the fluid filter by interchanging a filter element module with a flow blocking cover; increasing the flow capacity of the fluid filter by interchanging a flow blocking cover with a filter element module; and changing the flow capacity of the fluid filter by adding or removing one or more secondary filter housings having at least one filter element module.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A reconfigurable modular fluid filter comprising:
a base filter housing having an opening formed in one or more walls thereof,
a secondary filter housing removably coupled to the base filter housing, the secondary filter housing having an opening formed in one or more walls thereof;
wherein each opening in the base filter housing is constructed to be selectively removably coupled with one of a filter element module, an outlet port and a flow blocking cover, wherein the base filter housing is coupled with at least one filter element module, and wherein the opening in the secondary filter housing is constructed to be selectively removably coupled with another of a filter element module;
an unrestricted internal flowpath within the base filter housing fluidly connected between each filter element module and the outlet port; wherein each filter element module is configured to filter a working fluid in parallel with one another and discharge filtered working fluid into the internal flowpath;
wherein each filter element module comprises: a single preloading cover, a primary filter element positioned downstream of the single preloading cover, and a secondary filter element positioned downstream of the primary filter; and wherein each filter element module includes an outer case for holding the single preloading cover, the primary filter element and the secondary filter element in a desired position; and wherein the primary filter element is positioned directly adjacent the secondary filter element.

2. The modular fluid filter of claim 1, wherein the secondary filter element includes a plurality of separable filter elements.

3. The modular fluid filter of claim 1, wherein the single preloading cover is formed from a mesh material.

4. The modular fluid filter of claim 1, wherein the primary filter and the secondary filter are formed of one of a replaceable material and a washable material.

5. The modular fluid filter of claim 1, wherein the base filter housing is box shaped and the openings are optionally formed in a top, a bottom, either side, and either end thereof.

6. The modular fluid filter of claim 1, wherein each secondary filter housing includes:
a plurality of openings formed therein; wherein each opening is adapted to removably couple with one of a filter element module, another secondary filter housing and a flow blocking cover; and
a secondary unrestricted internal flowpath fluidly connecting each filter element module to the internal flowpath of the base filter housing.

7. The modular fluid filter of claim 1, wherein one or more secondary filter housings are connectable to the base filter housing along a horizontal and/or a transverse direction.

8. The modular fluid filter of claim 1, wherein each filter element module includes filter media comprising a plurality of materials and densities.

9. The modular fluid filter of claim 1, wherein the outlet port is connectable to a system operable for compressing a fluid.

10. The modular fluid filter of claim 1, wherein means for coupling the base filter housing and secondary filter housing to one another includes at least one of threaded fasteners, clips, press fit, weld, braze, and/or adhesive.

11. The modular fluid filter of claim 1, wherein the opening in the secondary filter housing is constructed to be selectively removably coupled with one of the filter element module, another secondary filter housing, and a flow blocking cover.

12. The modular fluid filter of claim 1, wherein the single preloading cover is positioned directly adjacent the primary filter element and the secondary filter element is spaced apart from the single preloading cover.

13. The modular fluid filter of claim 1, wherein the primary filter element and the secondary filter element are accessible and removable when the single preloading cover is removed from the outer case.

14. A reconfigurable modular fluid filter comprising:
a base filter housing having an opening formed in one or more walls thereof,
a secondary filter housing removably coupled to the base filter housing, the secondary filter housing having an opening formed in one or more walls thereof;
wherein each opening in the base filter housing is constructed to be selectively removably coupled with one of a filter element module, an outlet port and a flow blocking cover, wherein the base filter housing is coupled with at least one filter element module, and wherein the opening in the secondary filter housing is constructed to be selectively removably coupled with another of a filter element module;
an unrestricted internal flowpath within the base filter housing fluidly connected between each filter element module and the outlet port;
wherein each filter element module is configured to filter a working fluid in parallel with one another and discharge filtered working fluid into the internal flowpath;
wherein each filter element module comprises: a preloading cover, a primary filter element positioned downstream of the preloading cover, and a secondary filter element positioned downstream of the primary filter; and
wherein each filter element module includes an outer case for holding the preloading cover, the primary filter element and the secondary filter element in a desired position; and
wherein the primary filter element contacts the secondary filter element when each of the primary filter element and the secondary filter element are positioned in the desired position within the outer case.

15. The modular fluid filter of claim 14, wherein the primary filter element is positioned directly adjacent the secondary filter element without an additional preloading cover positioned therebetween.

16. The modular fluid filter of claim 14, wherein the primary filter element and the secondary filter element are slidably insertable into the desired position within the outer case.

17. The modular fluid filter of claim 14, wherein the outer case is an uninterrupted, single-piece outer case.

18. A reconfigurable modular fluid filter comprising:
a base filter housing having an opening formed in one or more walls thereof,
a secondary filter housing removably coupled to the base filter housing, the secondary filter housing having an opening formed in one or more walls thereof;
wherein each opening in the base filter housing is constructed to be selectively removably coupled with one of a filter element module, an outlet port and a flow blocking cover, wherein the base filter housing is coupled with at least one filter element module, and wherein the opening in the secondary filter housing is constructed to be selectively removably coupled with another of a filter element module;
an unrestricted internal flowpath within the base filter housing fluidly connected between each filter element module and the outlet port; wherein each filter element module is configured to filter a working fluid in parallel with one another and discharge filtered working fluid into the internal flowpath;
wherein each filter element module comprises: a single preloading cover, a primary filter element positioned downstream of the single preloading cover, and a secondary filter element positioned downstream of the primary filter; and
wherein each filter element module includes a one-piece outer case for holding the single preloading cover, the primary filter element and the secondary filter element in a desired position.

19. The modular fluid filter of claim 18, wherein the secondary filter element includes a plurality of separable filter elements.

20. The modular fluid filter of claim 18, wherein the secondary filter housing is connectable to the base filter housing along a horizontal and/or a transverse direction.

* * * * *